United States Patent Office 3,257,464
Patented June 21, 1966

3,257,464
PROCESS FOR THE PREPARATION OF ETHYL MERCAPTAN AND DIETHYL SULFIDE
Bernard Buchholz, Flourtown, and Roland H. Goshorn, Fort Washington, Pa., assignors to Pennsalt Chemicals Corporation, Philadelphia, Pa., a corporation of Pennsylvania
No Drawing. Filed May 14, 1963, Ser. No. 280,462
6 Claims. (Cl. 260—609)

This invention deals with the preparation of ethyl mercaptan and diethyl sulfide by the reaction of ethylene with hydrogen sulfide in the presence of a catalyst. More particularly, the process of this invention is directed to the preparation of ethyl mercaptan and diethyl sulfide by reacting ethylene with hydrogen sulfide in the presence of a catalyst comprising alumina promoted with an activating amount of an alkali metal salt of an oxygen acid of a Group VIB metal.

It is known in the art to react ethylene with hydrogen sulfide to obtain ethyl mercaptan and diethyl sulfide as products. Many catalysts have been disclosed for this reaction and the most common of these include alumina on silica, metal sulfides, and oxygen acids supported on a base (e.g., phosphoric acid on kieselguhr, tungstic acid on charcoal, etc.). All of the catalysts used heretofore have one or more serious disadvantages and a deficiency common to most of them is that they do not permit high conversions (i.e., over about 85%) to sulfur-containing products. Two of the better catalysts used with olefins other than ethylene, because they do permit relatively high conversions, are phosphoric acid on kieselguhr and alumina on silica. However, when these catalysts are used for the ethylene-$H_2S$ reaction they suffer from a rapid decrease in activity. After about 30 hours, the conversion to ethyl mercaptan falls from about 70% to 55% and lower; likewise, conversion to diethyl sulfide falls from about 11% to 3%. These catalysts also require for optimum conversions to ethyl mercaptan (i.e., about 55–70%) that the ratios of $H_2S$ to ethylene must be very high (e.g., on the order of 30:1 or higher).

It has now been found that very high conversions of ethylene to ethyl mercaptan and diethyl sulfide products can be obtained in a single pass of the reactants over the catalyst by reaction of ethylene with hydrogen sulfide with a catalyst of alumina promoted with an activating amount of an alkali metal salt (e.g., lithium, sodium, potassium, caesium, rubidium, etc.) of an oxygen acid of a Group VIB metal. In addition to obtaining high, single-pass conversions by the process of this invention, the catalyst life is surprisingly long. Still further advantages of the process of this invention are that high conversions to ethyl mercaptan are obtained using relatively low ratios of hydrogen sulfide to ethylene and that the specificity for ethyl mercaptan is quite high.

The catalyst used in the process of this invention is very specific. Where salts other than alkali metal salts are used, as for example alkaline earth metal salts (e.g., calcium, magnesium, etc.), conversions are significantly lower. Likewise, when other alkali metal salts of oxygen acids of nearby group metals are used (e.g., a Group VIIB metal), poor conversions are obtained.

The promoter which is an oxygen acid of the Group VIB metal will preferably be selected from the group of alkali metal chromates, molybdates and tungstates, but also useful in this invention are alkali metal dichromates (e.g., $Na_2Cr_2O_7$), dimolybdates (e.g., $Na_2Mo_2O_7$), paratungstates (e.g., $Na_6W_7O_{24}$) and the like.

The catalyst for use in this process is readily prepared by saturating alumina with an aqueous solution containing the alkali metal promoter salt and the aqueous mixture agitated to ensure thorough distribution. Then the liquid phase is removed and when dry, the solid is ready for use. The activating amount of promoter on the alumina will generally range from about 0.5 to about 15% by weight of the total weight of the catalyst (i.e., alumina plus promoter) and the preferred amount which gives optimum performance with minimum cost is between about 1 and 5 percent.

In carrying out the process of this invention, the dry catalyst composite prepared as described above is simply charged into a reaction vessel (conveniently a cylindrical reactor which may be a fixed or fluid bed reactor) and the reactant vapors of ethylene together with hydrogen sulfide vapors are passed through. The temperature at which the process will be operated will usually be between about 250° C. and about 450° C. Although reaction proceeds at temperatures below about 250° C., the space velocity of the gaseous reactants must then be kept very low in order to obtain significant conversions and at such low space velocities the process is generally not economical. At temperatures above about 400° C., however, a high proportion of the ethylene is polymerized to tars and this, of course, is undesirable. Preferably, the process will be operated in the temperature range of 350° to 385° C.

The space velocity of the ethylene reactant may vary over a wide range. Space velocity is a measure of the rapidity with which the ethylene is passed through the effective reaction zone, i.e., the zone in which conditions such as temperature, presence of catalyst, and the like are conducive to reaction. The higher the space velocity, the more ethylene that passes through the reaction zone in a given time. For the process of this invention, the reaction zone is comprised of the catalyst bed, and the space velocity is measured as the gaseous volume of ethylene corrected to 0° C. and 1 atmosphere pressure per volume of catalyst per hour. Catalyst volume is taken as the gross volume of the catalyst bed. The space velocity for the reaction will usually be between about 10 and 150 cc./hr./cc. of catalyst, but may be 400 or more cc./hr./cc. of catalyst when the higher temperatures (e.g., about 380° C.) are used. Conversely, at the lower temperatures of about 250° C., lower space velocities (say about 25 to 50 cc./hr./cc. of catalyst) will be used to obtain high conversion.

The process will be operated under a slight pressure of about 100 to 300 p.s.i.g., although pressures as high as 300 atmospheres or higher may also be used, but there is no need to exceed about 300 p.s.i.g. At pressures much below about 100 p.s.i.g., however (say at atmospheric pressure), the reaction, although operable, is considered impractical for commercial use. Under the usual operating conditions, the preferred pressure range is at least about 150 p.s.i.g. and preferably about 150 to 200 p.s.i.g. will be used.

The molar ratio of reactants may also vary widely and will determine the amount of sulfide in the reaction product. In general the mole ratio of $H_2S$ to ethylene will be between about 3:1 to 30:1, the higher ratio being limited only by economics. In order to obtain high conversion to mercaptan, the higher ratios of $H_2S$ to ethylene will be used. Conversely, to obtain high conversions to sulfide products, low ratios of $H_2S$ to olefin will be employed. The process is of particular interest for the preparation of ethyl mercaptan and for this product $H_2S$ to ethylene ratios of about 10:1 to 20:1 will be employed.

The invention is further illustrated by the following examples.

*Example 1*

A typical preparation of catalysts was carried out as follows: 100 g. of potassium tungstate in 475 cc. of water was added with mixing to 900 g. of activated alumina (Alcoa, Grade F-1, 8-14 mesh). The mixture was then dried at 130° to 140° C. and was ready for use.

*Example 2*

Mixtures of ethylene and $H_2S$ were preheated at 300–400° C. and passed into a continuous fixed-bed reactor over a catalyst of alumina containing 10% by weight of the total catalyst composition of potassium tungstate. The reactor effluent was then passed as a vapor into the sampling device of a vapor-phase chromatograph. The conversions and yields reported in Table I below were calculated from the chromatograms.

TABLE I

| Reaction Conditions | | | | Percent Conversion to— | | Percent Yield to Ethyl Mercaptan and Sulfide |
|---|---|---|---|---|---|---|
| Reactor Temp.,[1] °C. | Ethylene Space Vel.[2] | $H_2S/C_2H_4$, Mole Ratio | Pressure, p.s.i.g. | $C_2H_5SH$ | $(C_2H_5)_2S$ | |
| 250 | 38 | 12/1 | 175 | 26.3 | 6.4 | 100.0 |
| 290 | 19 | 12/1 | 175 | 42.0 | 45.0 | 100.0 |
| 290 | 38 | 12/1 | 175 | 49.4 | 27.9 | 100.0 |
| 325 | 38 | 12/1 | 175 | 61.3 | 27.1 | 100.0 |
| 350 | 19 | 12/1 | 175 | 60.8 | 32.2 | 100.0 |
| 350 | 19 | 30/1 | 175 | 71.1 | 12.8 | 100.0 |
| 350 | 19 | 6/1 | 0 | 31.3 | 2.7 | 100.0 |
| 355 | 38 | 3/1 | 175 | 37.6 | 50.0 | [3] 99.4 |
| 355 | 38 | 6/1 | 175 | 48.1 | 43.2 | [3] 97.4 |
| 355 | 38 | 12/1 | 175 | 61.8 | 28.3 | [3] 97.2 |
| 355 | 38 | 18/1 | 175 | 72.0 | 14.2 | 100.0 |
| 370 | 57 | 12/1 | 175 | 69.6 | 13.8 | [3] 96.6 |
| 370 | 38 | 18/1 | 175 | 75.6 | 13.5 | [3] 99.0 |
| 370 | 38 | 30/1 | 175 | 74.4 | 8.4 | [3] 99+ |
| 390 | 57 | 12/1 | 175 | 64.3 | 15.4 | [3] 90.8 |
| 390 | 38 | 18/1 | 175 | 64.6 | 10.1 | [3] 85.6 |

[1] Temperature of the reactants as they contact the catalyst. Temperatures within the catalyst bed may be somewhat higher due to heat of reaction.
[2] Cc. ethylene as a vapor at S.T.P./hr./cc. catalyst.
[3] At the higher temperatures and lower $H_2S/C_2H_4$ mole ratios, small amounts of thiophene and benzene were formed.

*Example 3*

Mixtures of ethylene and $H_2S$ were preheated at 300–400° C. and passed over 2%, 5% and 7.5% sodium molybdate on alumina catalyst in a continuous fixed-bed reactor. The reactor effluent was then passed as a vapor into the sampling device of a vapor-phase chromatograph. The space velocity was 36 cc. ethylene vapor at S.T.P./hr./cc. catalyst and the reactor pressure was 175 p.s.i.g. The conversions and yields reported in Table II were calculated from the chromatograms.

TABLE II

| Reaction Conditions | | | Percent Conversion | | Percent Yield to Ethyl Mercaptan and Sulfide |
|---|---|---|---|---|---|
| Percent $Na_2MoO_4$-$Al_2O_3$ | Reactor Temp., °C. | $H_2S/C_2H_4$, mole ratio | $C_2H_5SH$ | $(C_2H_5)_2S$ | |
| 2 | 363 | 18:1 | 69.1 | 1.0 | 100.0 |
| 5 | 363 | 18:1 | 77.1 | 4.7 | [1] 100.0 |
| 5 | 370 | 10:1 | 63.5 | 11.3 | 100.0 |
| 5 | 366 | 5:1 | 43.7 | 20.4 | 87.4 |
| 7.5 | 366 | 18:1 | 72.6 | 2.2 | [2] 100.0 |
| 7.5 | 376 | 10:1 | 60.6 | 13.4 | 98.3 |
| 7.5 | 374 | 5:1 | 49.7 | 27.3 | 95.1 |

[1] Process continued for 34 hrs. after which time catalyst was still active without decrease in conversion.
[2] Process continued for 35 hrs. after which conversion to ethyl mercaptan decreased only slightly to 71.9%.

*Example 4*

Hydrogen sulfide and ethylene were combined in an 18:1 mole ratio, preheated and passed over various tungstate alumina catalysts at 355° C. and 175 p.s.i.g. pressure. The ethylene space velocity was 38 cc. $C_2H_4$ vapor, S.T.P./hr./cc. catalyst. The results are shown in Table III.

TABLE III

| Catalyst Composition | Percent Conversion to— | | Percent Yield to Ethyl Mercaptan and Sulfide |
|---|---|---|---|
| | $C_2H_5SH$ | $(C_2H_5)_2S$ | |
| 100% $Al_2O_3$ (no promoter) | 55.6 | 0 | 100.0 |
| 0.5% $Na_2WO_4$-$Al_2O_3$ | 60.6 | 0 | 100.0 |
| 2.0% $Na_2WO_4$-$Al_2O_3$ | 72.7 | 3.5 | 100.0 |
| 10.0% $Na_2WO_4$-$Al_2O_3$ | 72.9 | 14.1 | 100.0 |
| 5.0% $K_2WO_4$-$Al_2O_3$ | 71.0 | 14.3 | 100.0 |
| 15.0% $K_2WO_4$-$Al_2O_3$ | 75.4 | 13.2 | 100.0 |
| 5.0% $K_2CrO_4$-$Al_2O_3$ | 66.9 | 0 | 100.0 |

It will be obvious to the skilled artisan that many changes may be made from the above description and examples without departing from the spirit and scope of the invention and accordingly the invention is not to be limited except by the following claims.

We claim:

1. The process of preparing ethyl mercaptan and diethyl sulfide by reacting hydrogen sulfide with ethylene at a temperature between about 250° and about 450° C. and at a pressure of at least about 100 p.s.i.g. in the presence of a catalyst consisting of alumina containing from about 0.5 to 15% by weight of an alkali metal salt of an oxygen acid of a Group VIB metal selected from the group of cromates, molybdates and tungstates.

2. The process of preparing ethyl mercaptan and diethyl sulfide by reacting hydrogen sulfide and ethylene at a temperature between about 350° and 385° C., at a pressure between about 100 and 300 p.s.i.g. and at a hydrogen sulfide to ethylene mole ratio of at least about 3:1 in the presence of a catalyst consisting of alumina promoted with between about 1% and 5% by weight of an alkali metal salt selected from the group of chromates, molybdates and tungstates.

3. The process of claim 2 wherein the alumina is promoted with sodium tungstate.

4. The process of claim 2 wherein the alumina is promoted with potassium tungstate.

5. The process of claim 2 wherein the alumina is promoted with sodium molybdate.

6. The process of claim 2 wherein the alumina is promoted with potassium chromate.

References Cited by the Examiner

FOREIGN PATENTS 532,676  1/1941  Great Britain.

OTHER REFERENCES

Langhout et al., "J. Applied Chem.," 4 (6), 285–9 (1954) (London).

CHARLES B. PARKER, *Primary Examiner.*

DELBERT R. PHILLIPS, *Assistant Examiner.*